United States Patent
Choi et al.

(10) Patent No.: US 6,686,725 B1
(45) Date of Patent: Feb. 3, 2004

(54) POWER SUPPLY CIRCUIT COMPENSATING POWER FACTOR

(75) Inventors: Heung Gyoon Choi, Suwon-Shi (KR); Kyu Suk Han, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/292,033

(22) Filed: Nov. 12, 2002

(51) Int. Cl.[7] ................................................. G05F 1/70
(52) U.S. Cl. ........................................ 323/207; 323/222
(58) Field of Search ................................. 323/288, 222, 323/205, 207, 284, 285

(56) References Cited

U.S. PATENT DOCUMENTS

| | | | |
|---|---|---|---|
| 5,349,284 A | 9/1994 | Whittle | 323/207 |
| 5,614,812 A * | 3/1997 | Wagoner | 323/222 |
| 5,790,395 A * | 8/1998 | Hagen | 363/89 |

\* cited by examiner

*Primary Examiner*—Shawn Riley
(74) *Attorney, Agent, or Firm*—Darby & Darby

(57) ABSTRACT

The present invention relates generally to circuit for stabilizing a voltage, and more particularly to a power supply circuit of a power factor compensation type maintaining a PFC output voltage to be either of daulized magnitudes according to an input voltage after classifying the input voltages by a certain critical voltage range, thus improving an efficiency by 2 to 3% in case of the low AC input voltage.

2 Claims, 4 Drawing Sheets

POWER SUPPLY CIRCUIT COMPENSATING POWER FACTOR

BACKGROUND OF THE INVENTION

1. Field of the Invention

The present invention relates to a circuit for stabilizing a voltage, and more particularly to a power supply circuit of a power factor compensation type maintaining a PFC output voltage to be either of dualized magnitudes according to an input voltage after classifying the input voltages by a certain critical voltage range, thus improving an efficiency by 2 to 3% in case of the low alternating current (AC) input voltage, which is different from related methods for controlling the power factor compensation (PFC) output voltage regardless of a magnitude of the input AC voltage.

2. Description of the Prior Art

Generally, a switching mode power supply circuit, which converts an input alternating current power to a direct current power and converts again the converted DC voltage to a DC voltage with the same power by a switching means, is popular in case of electronic communication devices, computer systems and electronic devices with large capacity.

However, the switching mode power supply circuit generates a switching noise, and so is recognized as a main reason for an environmental pollution of electromagnetic wave which draws attention nowadays. In case of a low power electronic device of a consumption type, its generated electromagnetic wave which is a switching noise is not so serious, and however an electronic device outputting a high voltage causes the serious environmental pollution.

Accordingly, in order to eliminate the high frequency noise generated in the present power supplies, Europe and Japan established IEC 1000-3-2 standard that a power factor compensation (PFC) method should be applied to the switching mode power supplies having an input consumption power of more than 75 Watts.

In this way, a reason of tightening the country's control is for taking care of people's health by suppressing the environmental pollution. This control related to the pollution is expected to be gradually extended.

Now, the related power supply circuit is explained with respect to FIG. 1. The related power supply circuit comprises an AC line filter 1 for receiving an alternating current power in a range of 90 to 264 Volts to eliminate noise of a surge state contained in the voltage; a bridge diode rectifier 2 for rectifying the alternating current power outputted from the AC line filter 1 into a direct current power; a PFC coil 3 consisting of an inductive element, of which an end is connected to an output end of the bridge diode rectifier 2, and an element for preventing a counter electromotive force; a PFC switch 4 having an end grounded and the other end connected to an output end of the PFC coil 3, which is turned on or off according to an inputted control signal to allow an output voltage of the PFC coil 3 to be transmitted to devices provided at a rear side only during its off state; a first resistor 6 and a second resistor 7 for receiving and feedback, in case the PFC switch 4 makes the voltage to pass, the voltage to divide the voltage; a PFC controller 5 receiving the voltage divided by the first resistor 6 and the second resistor 7 to compare the voltage to a reference voltage and to control a control signal to be applied to the PFC switch 4 according to a result of the comparison; and a filtering condenser 8 connected in parallel to the first resistor 6 and the second resistor 7 to stabilize an actual output voltage.

In the related power supply circuit having the above structure, when the alternating current power in a range of 90 to 264 Volts is applied to the power supply circuit, the AC line filter 1 normally uses a low pass filter in order to eliminate noise contained in the alternating current power in common use.

Then, the AC power outputted from the AC line filter 1 is rectified into a direct current power through the bridge diode rectifier 2. The rectified DC voltage by the bridge diode rectifier 2 passes a PFC coil 3 consisting of an inductive element and an element for preventing a counter electromotive force, to be delivered to devices provided at a rear side.

The PFC controller 5 receives the voltage divided by the first resistor 6 and the second resistor 7 after passing the PFC coil 3, and compares the voltage to a reference voltage to control a control signal to be applied to the PFC switch 4 according to a result of the comparison. The PFC switch 4 having an end grounded and the other end connected to an output end of the PFC coil 3 is turned on or off according to an inputted control signal to allow the output voltage of the PFC coil 3 to be transmitted to the devices provided at the rear side only during its off state.

The prior art corresponding to the above related power supply circuit is a U.S. Pat. No. 5,349,284. An explanation about the prior art is described with respect to FIG. 2.

In the FIG. 2, the same reference numerals are assigned to components having the same functions in comparison with the structure of FIG. 1. In addition, references of other components are arbitrarily assigned differently from reference numerals in the prior art.

Hereinafter, an operation of the prior art of FIG. 2 will be explained, and the explanation about the same components as FIG. 1 is omitted. A PFC controller 5 comprises a comparing unit 5A, a multiplexer 5C and a PWM IC 5B.

The PFC controller 5 is typically embodied as an exclusive IC.

Accordingly, an explanation of an overall operation is omitted because it is overlapped with the explanation in FIG. 1, but an operation of the PFC controller 5 is described in detail. Whether an alternating current voltage is inputted through an AC line or not is checked by a divided voltage by resistors R1, R2.

In addition, when the comparing unit 5A, which compares a reference voltage Vref across a resistor R5 and an output voltage Vout divided through resistors 6 and 7, determines that a divided voltage of the output voltage is larger than the reference voltage, that is when it recognizes an over voltage state, the controller outputs a logical low signal, and otherwise it outputs a logical high signal to control an operation of the multiplexer 5C, thus changing a PWM signal outputted by a PWM IC 5B for generating a control signal for controlling a PFC switch 4.

A diode D1 and a condenser C1 smoothes a voltage rectified by the bridge diode rectifier 2, and resistors R3, R4 are resistors for setting a bias for providing the reference voltage Vref.

However, although the PFC controller 5 employs specialized IC for an exclusive use, its efficiency rapidly decreases at an input voltage of 90 $V_{AC}$ to cause various problems such as a heat radiation and a high fabrication cost, etc.

That is, the related exclusive IC is optimally designed to maintain the PFC output voltage to be DC 400 V, and so in case of a minimum input AC voltage of 90 V, its relative PFC conversion efficiency is deteriorated in comparison to a case of the maximum input AC voltage of 265 V. Therefore, in case the minimum AC voltage of 90 V is inputted, the heat is radiated, thus having disadvantage in that an additional heat-proof counter plan is needed and its size may be large.

SUMMARY OF THE INVENTION

Accordingly, the present invention has been made keeping in mind the above problems occurring in the related art, and an object of the present invention is to provide a power supply circuit of a power factor compensation type maintaining a PFC output voltage to be either of daulized magnitudes according to an input voltage after classifying the input voltages by a certain critical voltage range, thus improving an efficiency by 2 to 3% in case of the low AC input voltage.

In order to accomplish the above object, the present invention provides a power supply circuit compensating a power factor, comprising: a voltage filter receiving for an alternating current power which is varying in a certain range, and eliminating and outputting noise contained in the voltage; a rectifier rectifying for the alternating current power outputted from the voltage filter into a direct current power; a voltage sensor and variable resistor for receiving an output signal of the rectifier, recognizing a magnitude of the present input AC voltage and outputting one of different control signals according to a predetermined reference value; a PFC coil of which an end is connected to an output end of the rectifier; a PFC switch having an end grounded and the other end connected to an output end of the PFC coil, which is turned on or off according to an inputted control signal to allow an output voltage of the PFC coil to be transmitted to a device provided at a rear side only during the turned off state; a voltage divider for dividing the voltage if the PFC switch allows the voltage to pass, wherein the rate of the division is dualized according to the control signal of the voltage sensor; a PFC controller for receiving the voltage divided by the voltage divider to compare the voltage with a reference voltage and to control the control signal to be applied to the PFC switch according to a result of the comparison.

Additional characteristics of the power supply circuit compensating the power factor according to the present invention for accomplishing the above object is in that the voltage sensor and variable resistor receives an output signal from the rectifier and determines if the present input AC voltage is in a low voltage range of 90 to 150 V or a high voltage range of 150 to 264 V, to vary the voltage division rate of the voltage divider in case of the low voltage range.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

First of all, the technical spirit of the present invention is briefly described. Assuming a voltage provided by a general power supply circuit has a maximum of DC 400 volt, a voltage needed to operate a system using the power supply circuit should maintain 270 volts which is 67% of the maximum voltage.

That is, assuming a DC voltage 400 volt is used at a normal state, the system can be operated in a good state although the 270 Volts DC power is applied to the system. Accordingly, in case a range of the input AC voltage is 90 to 264 volt, the present invention divides the whole range of the input voltage into a low voltage range of 90 to 150 V and a high voltage range of 150 to 264 V, and maintains the PFC output voltage to be DC voltage 270 V in the low voltage range and to be DC voltage 400V in the high voltage range, thus improving the PFC conversion efficiency in the low input voltage.

Hereinafter, a preferred embodiment of the present invention is described in detail with respect to the accompanying drawings.

Figure 3:
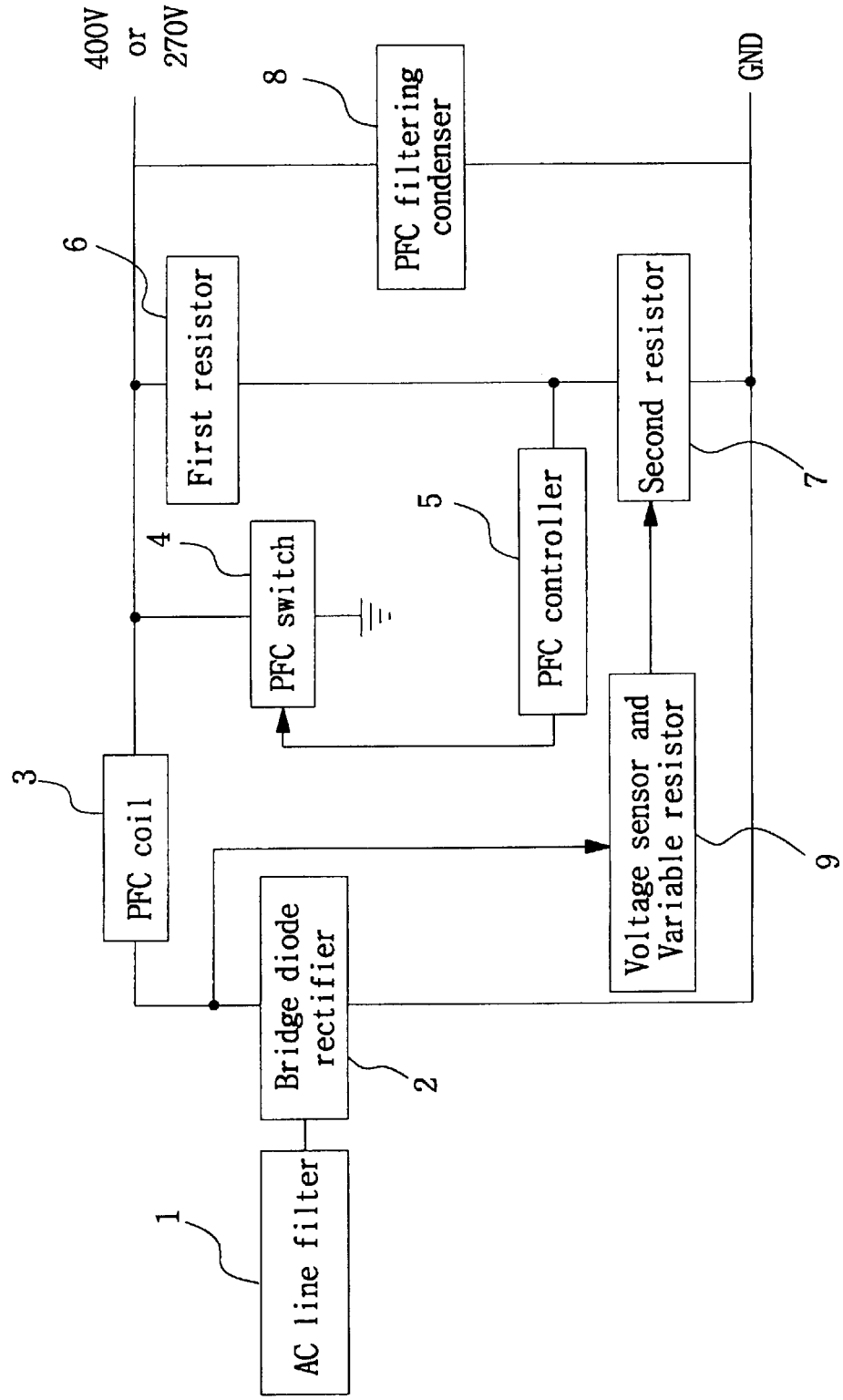
FIG. 3 is a block diagram of showing a power supply circuit according to a power factor compensation type of the present invention.

FIG. 3 is a block diagram illustrating the power supply circuit compensating a power factor according to the present invention.

The present invention includes an AC line filter 1 for receiving an alternating current power in a range of 90 to 264 Volts to eliminate noise of a surge state contained in the voltage; a bridge diode rectifier 2 for rectifying the alternating current power outputted from the AC line filter 1 into a direct current power; a PFC coil 3 consisting of an inductive element, of which an end is connected to an output end of the bridge diode rectifier 2, and an element for preventing a counter electromotive force; a PFC switch 4 having an end grounded and the other end connected to an output end of the PFC coil 3, which is turned on or off according to an inputted control signal to allow an output voltage of the PFC coil 3 to be transmitted to devices provided at a rear side only during its off state; a first resistor 6 and a second resistor 7 for receiving and feedback, in case the PFC switch 4 allows the voltage to pass, the voltage to divide the voltage; a PFC controller 5 for receiving the voltage divided by the first resistor 6 and the second resistor 7 to compare the voltage with a reference voltage and to control a control signal to be applied to the PFC switch 4 according to a result of the comparison; and a filtering condenser 8 connected in parallel to the first resistor 6 and the second resistor 7 to stabilize an actual output voltage; this structure being same as the related structure, except a voltage sensor and variable resistor 9 of the present invention.

The operation of the voltage sensor and variable resistor 9 will be described hereinafter.

The voltage sensor and variable resistor 9 is provided with a voltage of an output end of the bridge diode rectifier 2 to recognize a magnitude of the current input AC voltage and control a resistance of the second resistor 7 to be a preset value in case the magnitude is higher than a predetermined critical voltage range. Additionally, in case the magnitude is lower than the critical voltage range, the voltage sensor and variable resistor 9 controls the resistance of the second resistor 7 to be higher than the preset value to vary a reference point for operation of the PFC controller 5.

The operation of the power supply circuit according to the present invention constructed as above will be described.

When an alternating current power in a range of 90 to 264 Volts is applied, the AC line filter eliminates noise contained in the alternating current power. A low pass filter is normally used for filtering AC voltages.

Then, the AC power outputted from the AC line filter 1 is rectified into a direct current power through the bridge diode rectifier 2. The rectified DC power by the bridge diode rectifier 2 passes a PFC coil 3 consisting of an inductive element and an element for preventing a counter electromotive force, to be applied to devices provided at a rear side.

The PFC controller 5 receives the voltage divided by the first resistor 6 and the second resistor 7 after the PFC coil 3, and compares the voltage to a reference voltage to control a control signal to be applied to the PFC switch 4 according to a result of the comparison.

The PFC switch 4 having an end grounded and the other end connected to an output end of the PFC coil 3 is turned on or off according to an inputted control signal to allow the output voltage of the PFC coil 3 to be transmitted to the devices provided at the rear side only during its off state.

Meanwhile, the above operation is performed in case the voltage sensor and variable resistor 9 receives a voltage of an output end of the bridge diode rectifier 2 and determines that the present input AC voltage is in a high voltage range of 150 to 264 V.

In case of a low voltage range of 90 to 150 V, the voltage sensor and variable resistor 9 makes the resistance of the second resistor 7 to be higher than the preset value, and so the PFC controller 5 determines that the outputted voltage is high and controls the control signal to be applied to the PFC switch 4, thus maintaining the outputted voltage to be 270 $V_{DC}$.

Accordingly, the present invention prevents a load for the PFC conversion from entering its overload state, thus improving its whole efficiency.

As described above, the power supply circuit compensating a power factor of the present invention prevents the load for the PFC conversion from entering an overload state when the input AC voltage is in a low voltage range of 90 to 150 V, thus improving its efficiency in case the input AC voltage is low.

Figure 1:
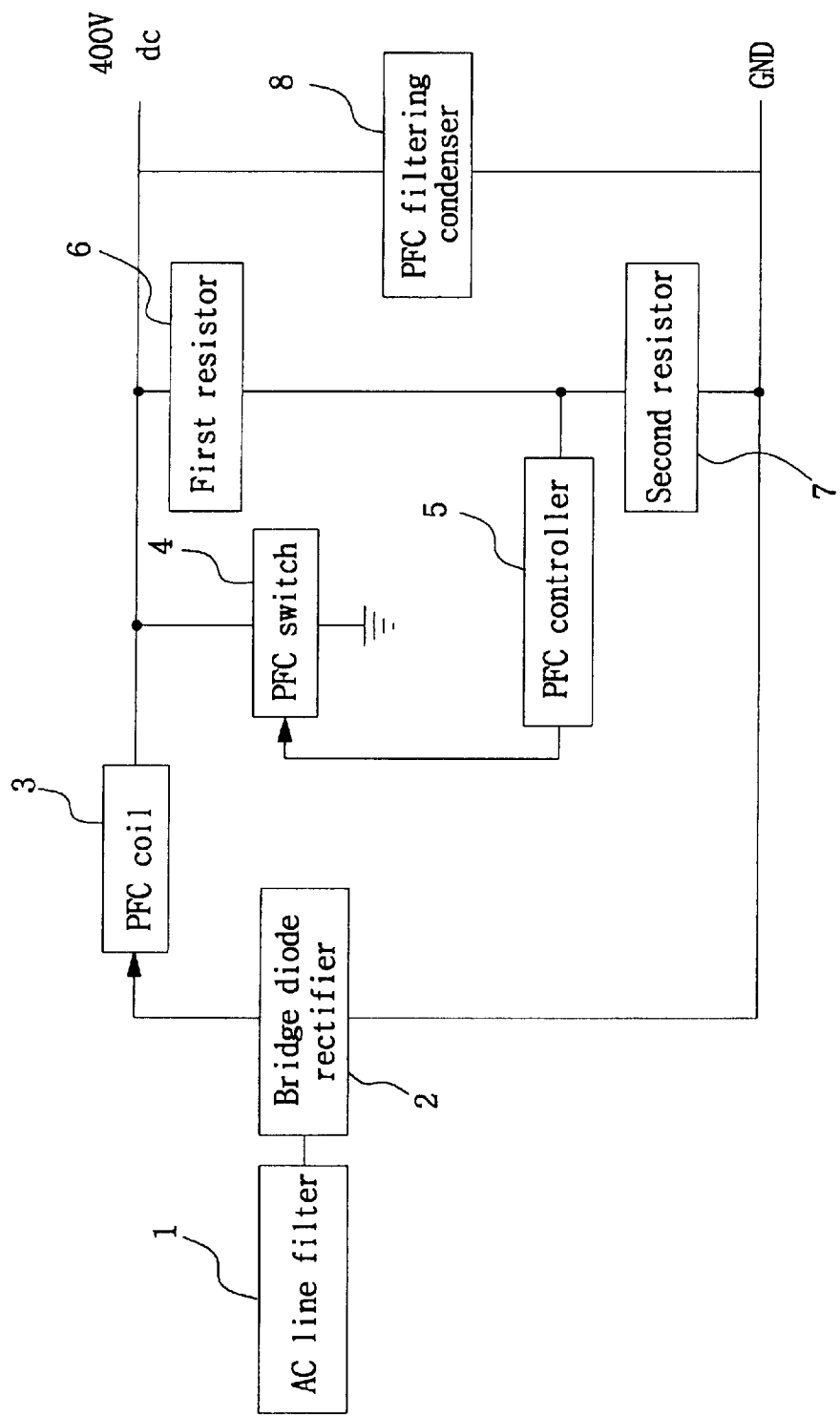
FIG. 1 is a block diagram illustrating the related power supply circuit compensating a power factor.
Figure 2:
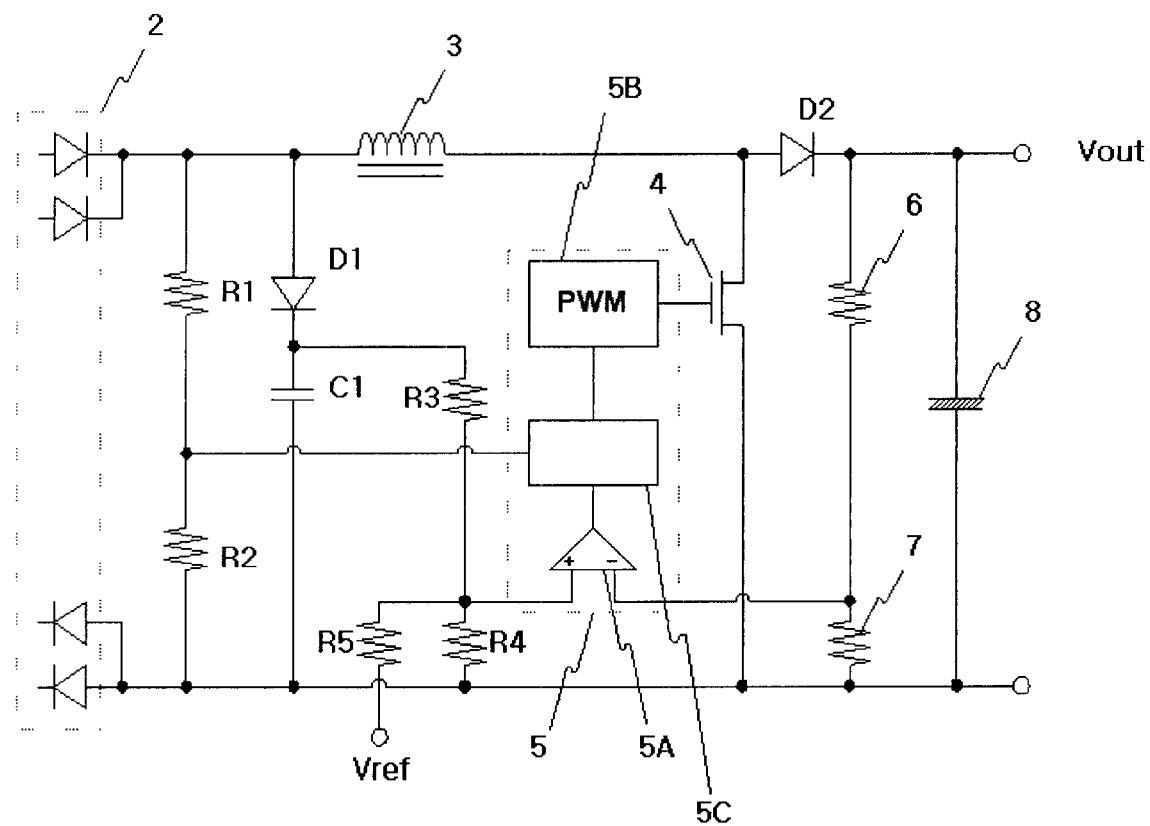
FIG. 2 is a detail view of showing a typical prior art according to the related art as shown in FIG. 1.
Figure 4:
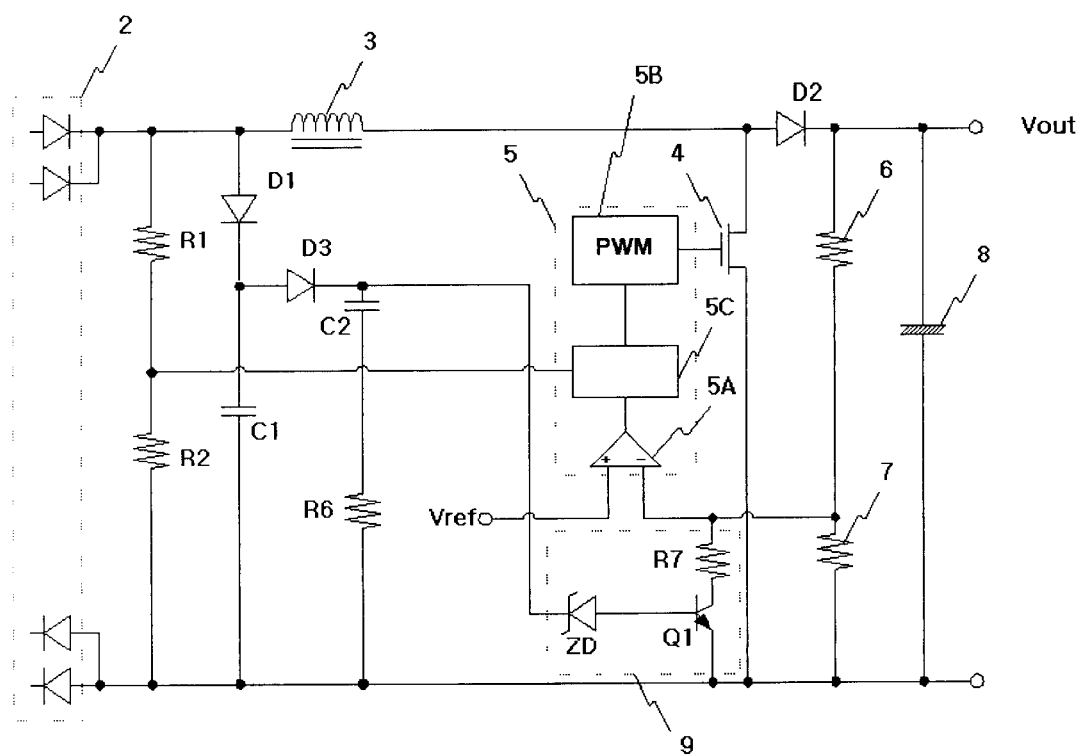
FIG. 4 is a detail view of showing, correspondingly to the related art of FIG. 2, the power factor compensation type power supply circuit of the present invention of FIG. 3.

The operation of the present invention is described with respect to FIG. 4. FIG. 4 is a detail view of showing, correspondingly to the related art of FIG. 2, the power factor compensation type power supply circuit of the present invention of FIG. 3.

A voltage sensor and variable resistor 9 in FIG. 4 comprises a zener diode ZD that is turned on by a reverse electromotive force when a voltage across the cathode is more than a limited value at the case an input voltage is converted into a direct current voltage; a transistor Q1 of which a base is connected to an anode of the zener diode ZD, the transistor being turned on when the zener diode ZD is turned on; and a resistor R7 positioned between a connection point of the resistors 6 and 7 dividing the output voltage Vout and a collector of the transistor Q1, the resistor being parallel connected to the resistor 7.

As mentioned above, the present input alternating voltage is classified into a low voltage region of 90 V to 150 V and a high voltage region of 150 V to 264 V.

A case of the low voltage region is as follows. As the voltage is in a low voltage after passing a diode D3 and being smoothed by capacitor C2 and resistor R6, the -zener diode ZD keeps its open state.

Therefore, a base of the transistor Q1 receives a high impedance or the low voltage to keep its off state, so a voltage across an input-end for a reverse data of the comparing unit 5A is a divided voltage of the output voltage Vout by the resistors 6 and 7.

On the other hand, when the voltage across the cathode of the zener diode ZD is a high voltage, the zener diode ZD is turned on by an reverse electromotive force and so the transistor Q1 is also turned on.

Accordingly, a resistor R7 connected to a collector of the transistor Q1 is parallel connected to a resistor 7.

As the resistor 7 and the resistor R7 are parallel connected, an overall resistance of these resistors is smaller than the respective original resistance, and so a voltage across a resistor 6 is a comparatively largely divided voltage in comparison with the above low voltage case.

That is, the voltage across the input end for a reverse data is small, and so a difference between the voltage and the reference voltage having a uniform voltage is large.

Therefore, any additional heatproof counter plan is not necessary, thus avoiding an increase of the size of the whole apparatuses resulting from any devices for the heatproof.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A power supply circuit compensating a power factor, comprising:

a voltage filter receiving for an alternating current power which is varying in a certain range, and eliminating and outputting noise contained in the voltage;

a rectifier rectifying for the alternating current power outputted from the voltage filter into a direct current power;

a voltage sensor and variable resistor for receiving an output signal of the rectifier, recognizing a magnitude of the present input AC voltage and outputting one of different control signals according to a predetermined reference value;

a PFC coil of which an end is connected to an output end of the rectifier;

a PFC switch having an end grounded and the other end connected to an output end of the PFC coil, which is turned on or off according to an inputted control signal to allow an output voltage of the PFC coil to be transmitted to a device provided at a rear side only during the turned off state;

a voltage divider for dividing the voltage if the PFC switch allows the voltage to pass, wherein the rate of the division is dualized according to the control signal of the voltage sensor and variable resistor;

a PFC controller for receiving the voltage divided by the voltage divider to compare the voltage with a reference voltage and to control the control signal to be applied to the PFC switch according to a result of the comparison.

2. The power supply circuit compensating a power factor according to claim 1, wherein the voltage sensor and variable resistor receives an output signal from the rectifier and determines if the present input AC voltage is in a low voltage range of 90 to 150 V or a high voltage range of 150 to 264 V, to varying the voltage division rate of the voltage divider in case of the low voltage range.

* * * * *